March 13, 1962 D. H. BOND 3,025,464
CAPACITANCE PROBE FOR A PIPE LINE
Filed May 8, 1958 3 Sheets-Sheet 1
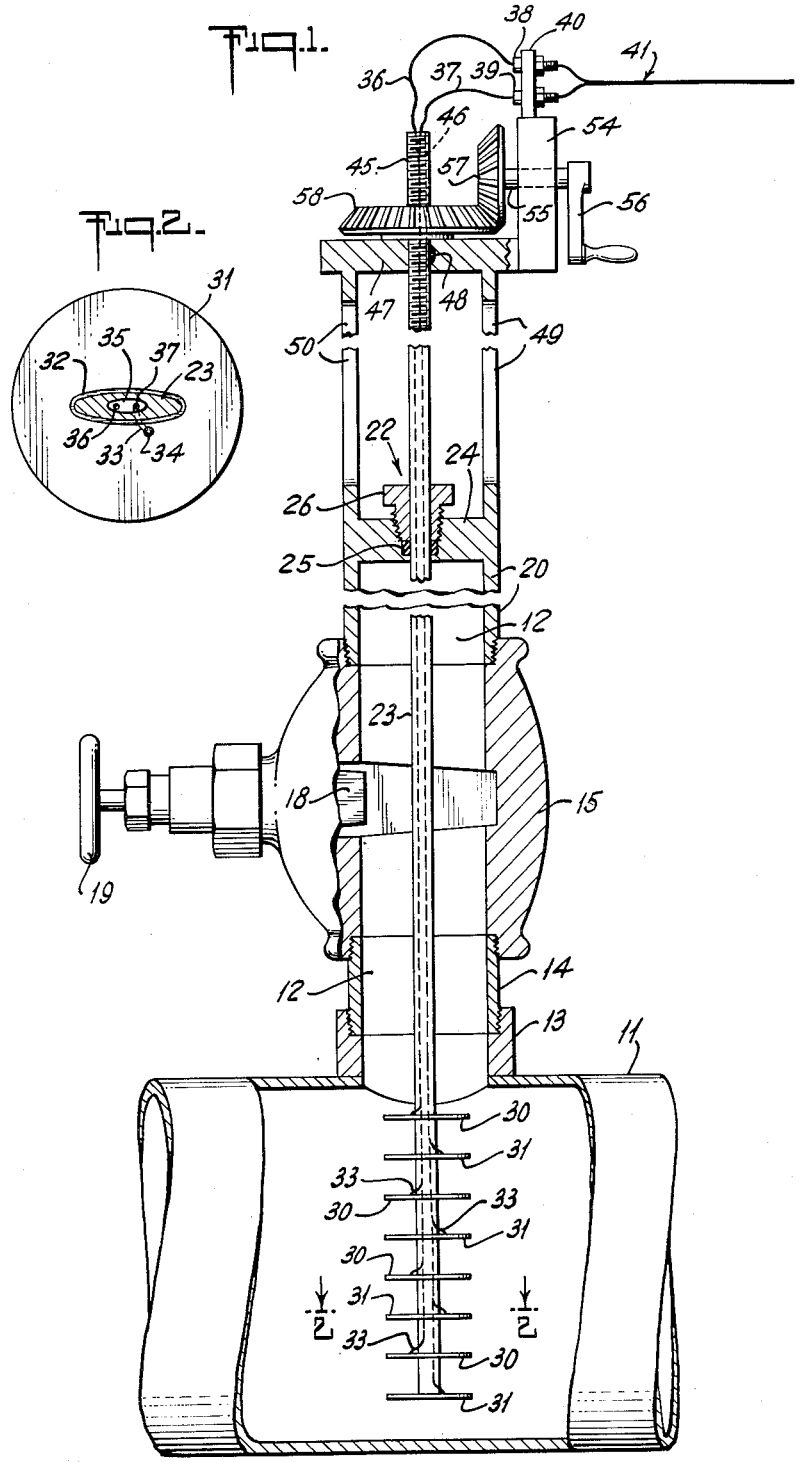

March 13, 1962 D. H. BOND 3,025,464
CAPACITANCE PROBE FOR A PIPE LINE
Filed May 8, 1958 3 Sheets-Sheet 2
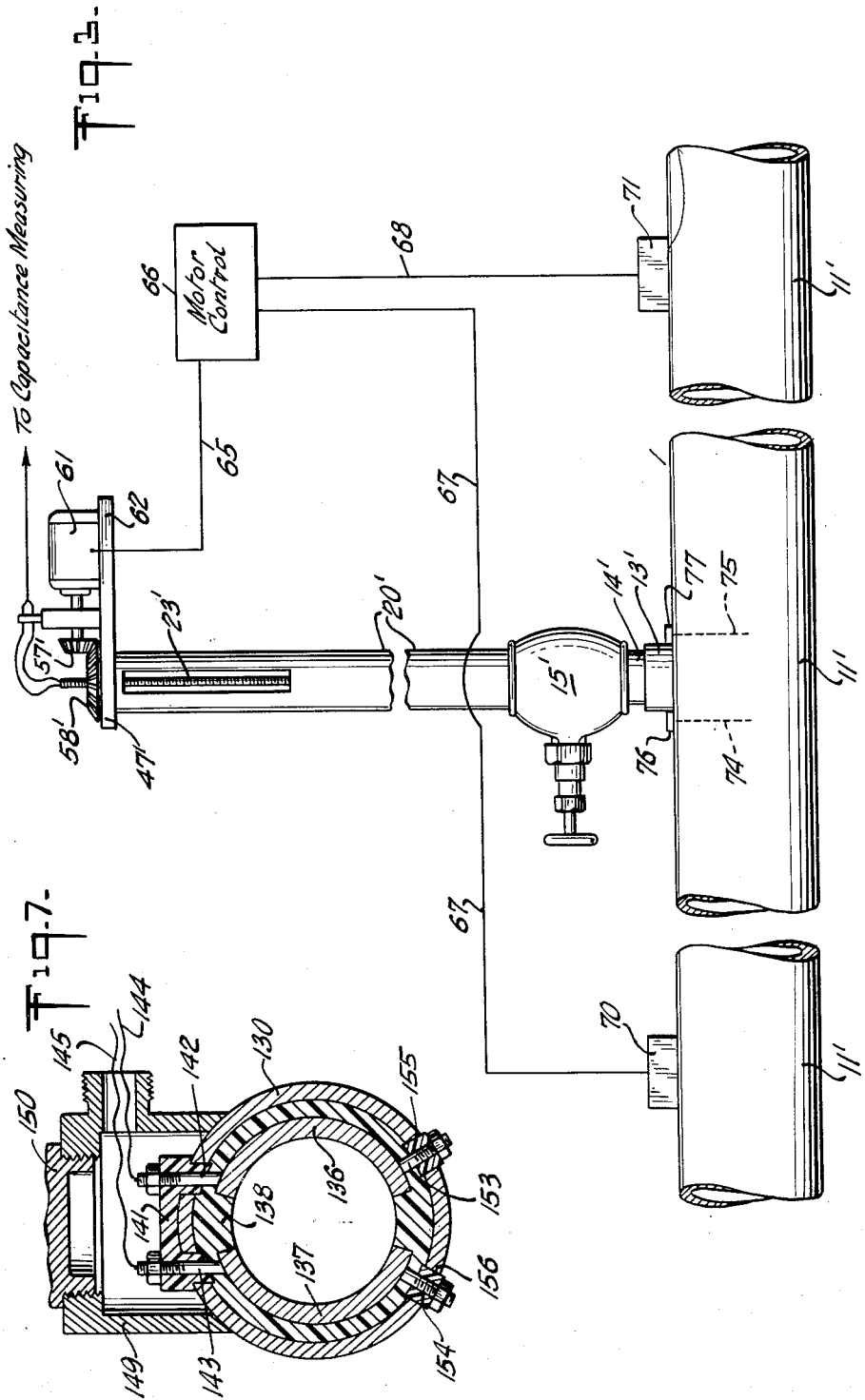

United States Patent Office 3,025,464
Patented Mar. 13, 1962

3,025,464
CAPACITANCE PROBE FOR A PIPE LINE
Donald H. Bond, Houston, Tex., assignor to The Texas Pipe Line Company, Houston, Tex., a corporation of Texas
Filed May 8, 1958, Ser. No. 734,021
5 Claims. (Cl. 324—61)

This invention is concerned with capacitance measuring probes for pipe lines, in general. More specifically, the invention deals with a capacitance probe for use with pipe lines, that is retractable, or that has an unobstructed bore the same diameter as the pipe line. In addition, the invention concerns a system, for use with a retractable probe, that provides for retraction of the probe automatically at the approach of an object such as a scraper or the like.

Capacitance probes are used in pipe lines in the petroleum industry, to measure the dielectric properties of fluid in the line. In this way, a continuous measurement and indication may be taken, so that a determination is had which may be used as to the identification of any given batch of fluid flowing in the pipe line. Such determination may be made by reason of the fact that different batches of oils or other petroleum products have different dielectric properties. Consequently, by knowing which dielectric value belongs to a given batch of fluid, identification of such fluid batch is possible.

Heretofore, capacitance probes for pipe lines have been built into a section of pipe in a permanent structure which was supported from the pipe walls and occupied the central space of the pipe. Consequently, the presence of a probe in a pipe line rendered the use of large solid objects passing through the line impossible. Therefore, it was formerly necessary to provide a by-pass section of pipe, that contained the probe, in order to allow the passage of scrapers or other solid objects. This had the drawbacks, among others, that the by-pass line was an added expense; and the measurement of the dielectric probes by such arrangement was not as satisfactory as a direct measurement in the main line.

Consequently, it is an object of this invention to provide a retractable capacitance measuring probe that overcomes the above-indicated drawbacks of the prior art.

Another object of this invention is to provide a retractable capacitance probe that is easily removable for cleaning or repair of the probe.

Another object of this invention is to provide a retractable probe that may be withdrawn to allow passage of scrapers or similar solid objects and then be returned as soon as such object has passed.

Another object of this invention is to provide a retractable probe that may be withdrawn from the line and removed for repair, or cleaning, etc. without disturbing the flow in the pipe line.

Still another object of this invention is to provide a system employing a retractable capacitance probe that may be automatically retracted and reinserted by employing sensing means both up and down stream from the probe location.

Another object of the invention is to provide a capacitance probe having an unobstructed bore therethrough with the same clearance as the inside diameter of the pipe line itself.

Briefly, this invention concerns a capacitance probe for a pipe line. Such probe comprises a plurality of electrodes having open space therebetween to allow the fluid in said pipe line to flow therein in order to act as the dielectric for said electrodes. The probe also comprises means for supporting said electrodes directly in the main stream of said pipe line and means associated with said support means for retracting at least one of said electrodes out of the main stream of said pipe line to provide an unobstructed passage and for returning same back into the main stream again.

Again, briefly, the invention may be described as a retractable capacitance probe system for a pipe line. The system comprises a retractable probe including retracting means and having motor means for driving the retracting means. The system also comprises first sensing means located up stream from said probe on said pipe line for sensing the passage of a solid article, and a motor control circuit for controlling the energization of said motor means to retract said probe responsive to said sensing means. The system also comprises second sensing means located down stream from said probe on said pipe line for sensing the passage of said solid article and for providing a signal to said motor control circuit to return said probe into the pipe line.

In addition the invention may be briefly described as a capacitance probe for a pipe line which comprises a plurality of electrodes having open space therebetween to allow the fluid in said pipe line to flow therein to act as the dielectric for said electrodes. The probe also comprises means for supporting said electrodes directly in the main stream of said pipe line. The supporting means includes means for providing an unobstructed passage at said probe to allow solid objects passing through said pipe line to freely pass said probe.

The foregoing and other objects and benefits of the invention are set forth below in greater detail, and illustrated in the drawings, in which:

FIG. 1 is an elevation, partly in cross section, showing the details of a probe according to the invention;

FIG. 2 is an enlarged cross sectional detail, taken along the lines 2—2 of FIG. 1, looking in the direction of the arrows;

FIG. 3 is a schematic showing of a system according to the invention, that employs a retractable probe and automatic control for retracting same;

FIG. 7 is an enlarged transverse cross section view taken along the lines 7—7 of FIG. 6.

Figure 4:
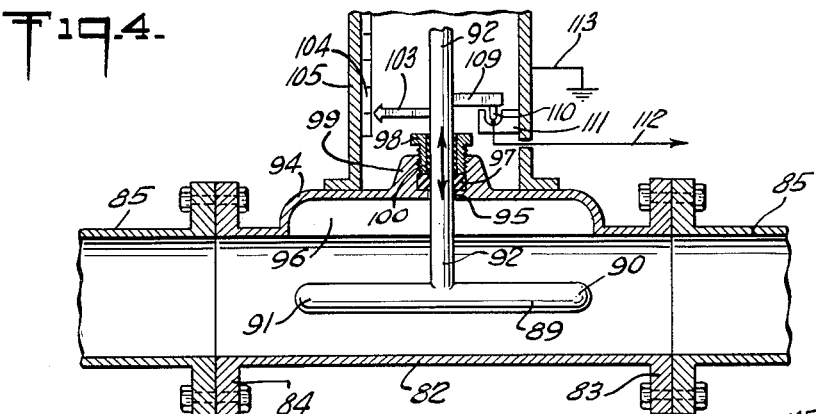
FIG. 4 is a longitudinal cross section view of another embodiment of a retractable probe according to the invention.

Referring to FIGS. 1 and 2, it is pointed out that there is a pipe line 11, a fragment of which is illustrated in the drawing. The pipe 11 has integrally attached thereto, and extending at right angles to the axis thereof, an enclosed passageway 12.

The passageway 12 is made up of a housing which includes a T-joint pipe 13. This T-connected pipe 13 may be integrally attached to the pipe line 11 in any feasible manner, such as by being cast as a unit therewith, or by being welded onto the pipe section 11 of the pipe line. This housing that encloses passageway 12 also includes a nipple 14 which is threaded into the T-joint 13. Next above the nipple 14 there is a gate valve 15, the body of which threadably receives the upper end of the nipple 14.

Gate valve 15 may be a standard type of valve, having a gate 18 and a handle 19 for actuating the gate. The use of a gate valve has been chosen by reason of the internal structure thereof, which provides for a full diameter unobstructed passageway through the body thereof when the valve is wide open. It will be observed that other types of valves might be employed so long as the passageway therethrough may include an unobstructed path for joining the nipple 14 with a closed top pipe 20, that is located above the valve. It will be observed that the pipe 20 is threadably secured to the other end of the passage through the body of gate valve 15, in a conventional manner.

Supported centrally within the passageway 12, there is a shaft 23 that passes through a solid top 24 of the pipe 20. A fluid tight seal 22 is provided between top 24 and the shaft 23, in a conventional manner, by means of a packing gland 26 and a washer 25.

At the lower extremity of the shaft 23 (when the parts are in the attitude illustrated) there are a plurality of round, flat, conductive material plates 30 and 31. These are the electrodes of the capacitance probe structure, and consequently at least one set of alternately located plates 30 or 31 must be electrically insulated from the other. This may be accomplished in various manners. For example, the set of alternate plates 31 may be insulated from the shaft 23 by means of an insulating material washer 32 (FIG. 2) which lies between the plate 31 and the shaft 23. These elements (plate 31, washer 32 and shaft 23) may be press fitted together, or otherwise constructed in any feasible manner, e.g. if the shaft 23 were round in cross section the plates could be threaded and clamped in place using insulating sleeves etc. as required.

Capacitor plates 30 and 31 may be formed out of any suitable conductive material. They are preferably a metal or alloy having adequate mechanical strength while being resistant to corrosive effects from the fluid in the pipe line. For example stainless steel is one alloy that might be employed. The geometric shape of the plates 30 and 31 is shown as round. This shape has to be employed in order to conform with the cross section shape of the passageway 12. However, any other shape might be employed if desired. The spacing between adjacent plates may vary, of course, as this is a factor in determining the electrical characteristics of the probe.

It is pointed out that there are a pair of conductor wires 36 and 37 that electrically connect each set of plates 30 and 31 respectively, together. The conductor wire employed for this purpose is insulated except for an electrical connection 34 (FIG. 2) with each plate; and wires 36 and 37 may extend along the shaft 23 in any feasible manner, such as by lying within a hollow passage 35 (FIG. 2) that extends upward along the center of shaft 23.

It will be observed that each one of conductor wires 36 and 37 is connected to an entire set of plates 30 and 31 respectively, by short jumper connectors 33. In this manner each set of plates or electrodes 30 and 31 forms a set of plates of a capacitor; each set being connected electrically together, in order to provide the desired capacity for the capacitor probe. It will be understood that one set, e.g. plates 30, could be connected to the shaft 23 without insulation therefrom, in the event that it is desired to have one set maintained at ground potential.

The conductors 36 and 37 extend out of the top of shaft 23, and are connected to a pair of binding posts 38 and 39 respectively, that are attached in turn to an insulating material panel 40. It is contemplated that the electrical circuit which employs conductors 36 and 37 will be continued from the panel 40 by means of a cable 41 which may take any feasible form, but is preferably a coaxial, or shielded, cable.

At the upper end of shaft 23 there is a threaded portion 45, which has a longitudinal groove 46 extending along one side of the threaded portion 45 thereof. Cooperating with the groove 46, and supported by an upper support structure 47, there is a tongue 48 which extends into the groove 46 and prevents shaft 23 from turning.

Support structure 47 is integrally attached to the closed-top pipe 20 by means of a pair of legs 49 and 50.

Also integral with support structure 47 there is an upstanding member 54, which acts as a bearing support for a shaft 55, which in turn has a handle 56 attached to one end thereof. On the other end of shaft 55, there is secured for rotation therewith a bevel gear 57, which meshes with and transmits rotation to another bevel gear 58. Bevel gear 58 has the axial hole therethrough internally threaded, to match the threads 45 of shaft 23.

Thus the shaft 23 may be raised or lowered by rotating handle 56, which in turn rotates bevel gear 57 and meshing bevel gear 58, to cause a translation of shaft 23 since rotation thereof is prevented by means of the tongue 48 in cooperation with groove 46.

It will be observed that pipe 20 is illustrated broken off, to indicate that its length is greater than that illustrated. This is done to save space on the drawing, for the reason that the length of pipe 20 must be sufficient to allow the plates 30 and 31 on the end of shaft 23 to be completely withdrawn vertically upward above the top of gate 18 of the valve 15. It will be understood that the reason for this is to make provision for withdrawing the capacitance probe entirely, without interrupting the flow of fluid in the main pipe line 11.

Referring to FIG. 3, it will be observed that there is schematically illustrated a system which employs elements that are similar to some of the details illustrated in FIGS. 1 and 2. Consequently those elements which correspond with those shown in FIGS. 1 and 2 are given corresponding reference numbers with a prime mark added. Thus, there is shown a gate valve 15' that is attached to a section of a pipe line 11' and has a closed-top pipe 20' attached to the other end thereof. In addition, the upper support structure 47' is shown carrying bevel gears 58' and 57' thereon. Also the shaft 23' is shown where it extends upward through the open portion of the support structure that is integrally attached to the top of the pipe 20'.

In the automatic system of FIG. 3 there is employed an electric motor 61 that is carried on a support platform 62 which may be integrally attached to the structure 47'. The electrical system for controlling motor 61 is schematically indicated by a single line circuit diagram, which includes a circuit connection 65 from the motor 61 to a motor control circuit 66 that is indicated in block diagram form with the caption "Motor Control" thereon. Also connected to the motor control circuit 66, via circuit connections 67 and 68, there are a pair of sensing devices 70 and 71. It will be observed that sensing devices 70 and 71 are located an appropriate distance up and down-stream along the pipe line 11', from the location of the probe that is indicated by gate valve 15'.

It is pointed out that the details of motor control circuit 66, as well as those of sensing elements 70 and 71, may take various conventional forms. Thus, such details form no part, per se, of this invention and any feasible form of these well-known elements may be employed.

There is also schematically indicated a pair of protector bars 74 and 75. These protectors are carried by any feasible type support structures 76 and 77 respectively, located adjacent to the passageway comparable to passageway 12 of the FIG. 1 embodiment. In this embodiment the passage extends through the T-joint 13' and the nipple 14'. The structure of protector bars 74 and 75 may take any feasible form. It is contemplated that they may be provided with an arrangement (not shown) for locking them down in the vertical position indicated in FIG. 3 in order to act as protection against the passage of a solid object through the pipe line 11' which might damage the plates of the probe. It is additionally contemplated that such locking structure be arranged so that the protector bars 74 and 75 are unlocked after the probe has been retracted so that the bars may freely swing to allow the passage of a scraper or other solid object. In this connection there should be provided recessions in the walls of the pipe 11' to receive the protector bars 74 and 75 when they pivot to clear the line.

*Operation of FIG. 3*

The operation of the system illustrated in FIG. 3 is straight forward and concerns automatic retraction of the capacitance probe. As a solid object, such as a scraper or the like, passes the up-stream one of the sensing devices 70 or 71 an electrical signal will be generated that will actuate a control function in the motor control circuit 66 to energize the motor 61 and cause it to run in a given direction such that the shaft 23' will be raised vertically upward a sufficient distance to withdraw the probe entirely from the pipe line 11'. The distance of sensing device 70 or 71 (along the pipe line 11') from the location of the probe, should be sufficient to allow ample time for the complete withdrawal of the probe. Next, after the scraper or other solid object has passed the probe location in pipe line 11', the probe will be lowered into the pipe line again. This is accomplished in the illustrated system by having the other sensing device 70 or 71 that is located down-stream from the valve 15' provide a control signal that will cause the motor 61 to run in the other direction and return the probe (by sliding shaft 23' vertically downward) to the lower position thereof, such that the probe is again fully immersed in the fluid of the pipe line 11'.

It is to be noted that when protector bars 74 and 75 are employed, they will act to arrest any solid object and prevent damage to the probe in the event that the probe has not been fully retracted prior to the arrival of such object at the up-stream one of said protector bars 74 and 75.

FIG. 4 illustrates another embodiment of a retractable capacitance probe according to the invention. There is a tubular body portion 82 that has flanges 83 and 84 integrally attached at either end thereof, for mounting the probe directly into a pipe line 85. In the arrangement illustrated the tubular body portion 82 need not be electrically insulated from the pipe line 85, since the electrical circuits involved are of a type which make use of a ground return arrangement so that the body portion 82 may be part of the ground return circuit.

Retractably and centrally located along the axis of body portion 82, there is a cylindrical electrode 89 that is constructed of a conductive material such as stainless steel or the like such that it is not subject to corrosive attack by the fluid flowing in the pipe line. There are rounded ends 90 and 91, as illustrated. It will be clear that the electrode 89 might be constructed in the form of a hollow cylinder having open ends, if desired. Also the electrode 89 might be hollow with closed ends, such as rounded ends 90 and 91.

There is a supporting shaft 92 that is integrally attached to the middle of electrode 89, and that extends at right angles to the axis of the probe body 82. Shaft 92 extends upward (as viewed in FIG. 4) through an opening 95 in a protrusion 94 on the tubular body 82. Protrusion 94 forms a recess or nesting chamber 96 connected with the body 82 of the probe. Adjacent to the opening 95 and surrounding the shaft 92 there is an electrically insulating material washer 97 that acts to seal the shaft 92 in a fluid tight manner, while at the same time it electrically insulates the shaft from the body portion 82 of the probe. Located above washer 97 there is a hollow threaded plug 98 that is threadably received in a counter bore concentrically situated with the opening 95 in a boss 99 that is integral with the protrusion 94. Thus, boss 99 surrounds washer 97 above the opening 95. Also there is an insulating material sleeve, or liner 100 inside of the plug 98.

There is an indicating arm, or pointer 103 attached to the shaft 92. This indicator 103 has a sharp point at its extremity adjacent to a scale 104 that is carried on a support structure 105 which is integrally attached to the body 82 of the probe, over the protrusion 94 and surrounding the boss 99.

Also carried securely attached to the shaft 92, there is an electrically conductive material arm 109 that has a contact making lug 110 near the extremity thereof. Carried on the structure 105, there is a female contact member 111 that has an electrical circuit connector or wire 112 directly connected thereto. There is a grounded circuit connector, or wire 113 for completing the electric circuit of the probe.

*Operation of FIG. 4*

It will be observed that the probe illustrated in FIG. 4 operates in the following manner. When the electrodes 89 and 82 are in the positions illustrated, the probe is in operative status for measuring the electrical capacitance, as determined by the dielectric properties of the fluid in the pipe line which surrounds electrode 89 and contacts the inner surfaces of body electrode 82. When it is desired to retract the electrode 89, in order to leave the passage through the probe clear of all obstructions, shaft 92 is moved upward until electrode 89 is nested entirely within the chamber 96 so as to leave the passage through the probe completely free.

As the electrode 89 is being retracted by moving shaft 92 upward, the indicator arm 103 moves relative to the scale 104 so that the position of the electrode 89 may be observed at all times. Also, whenever the electrode 89 is retracted, a short circuit on the electrical system for the probe is avoided by the opening of switch contacts 110 and 111 since the arm 109 is moved upward with the shaft 92.

Figure 5:
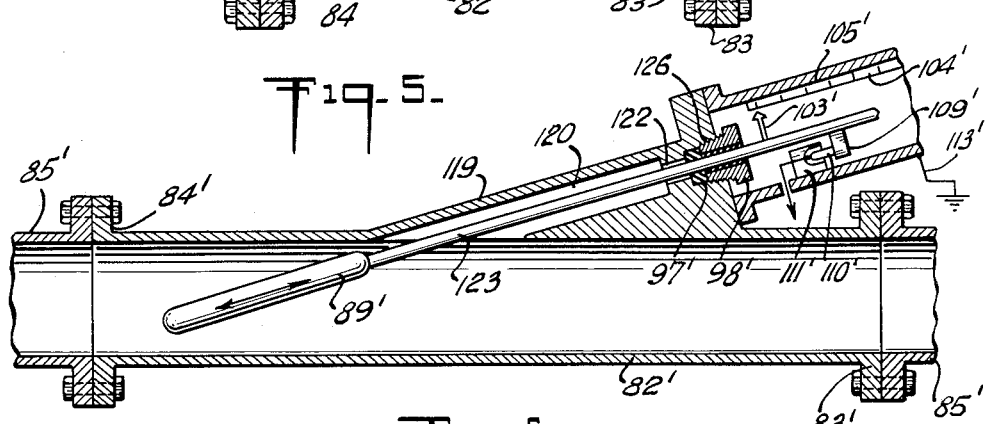
FIG. 5 is a longitudinal cross section view of still another embodiment of a retractable probe according to the invention.

Referring to FIG. 5 it will be observed that there is another embodiment shown for a retractable probe. This probe has many similarities to the FIG. 4 embodiment, and the corresponding elements which are substantially unchanged are given corresponding reference numbers with a prime mark added thereto. Thus, there is a pipe line 85' into which the probe is connected by means of flanges 84' and 83'.

The body 82' of the probe is constructed of electrically conductive material and has a protrusion 119 which encloses a retraction chamber 120 that corresponds to chamber 96 of the FIG. 4 modification. However, in this case chamber 120 has the configuration of an angularly extending bore that has a greater diameter than the external diameter of electrode 89'. This bore, or chamber 120 is connected into the central space within body 82', at a relatively acute angle such that electrode 89' lies at only a small angle with respect to the axis of the body 82'.

The electrode 89' may be constructed of the same material and manner as electrode 89, which was described above. However, a supporting shaft 123 is attached longitudinally at one end of the electrode 89' instead of at right angles thereto.

At the other end of the chamber 120 there is an opening 122 through which the shaft 123 passes without making contact with the structure of the protrusion 119.

Shaft 123 is longitudinally movable through a fluid tight seal structure, that is in all respects similar to the arrangement in FIG. 4 for making a seal with shaft 92. Thus there is a washer 97' which acts as an electrical insulator as well as a fluid seal. Also there is a hollow plug 98' that is received in a threaded counter bore 126 in the surface of protrusion 119.

There is an indicator 103', and there are electrical switch elements 110' and 111', all of which fully correspond with the elements described above in connection with FIG. 4.

The operation of the FIG. 5 arrangement is substantially the same as that of the FIG. 4 embodiment, so that no detailed review thereof is deemed necessary.

It will be noted that in either of the FIG. 4 or FIG. 5 embodiments there may be employed structure similar to the elements illustrated and described in connection with FIG. 1 for retracting the electrode elements. In addition, it will be clear that, as is the case with the FIG. 1 embodiment, an automatic motor driven retraction system may be employed instead of a manual arrangement.

Figure 6:
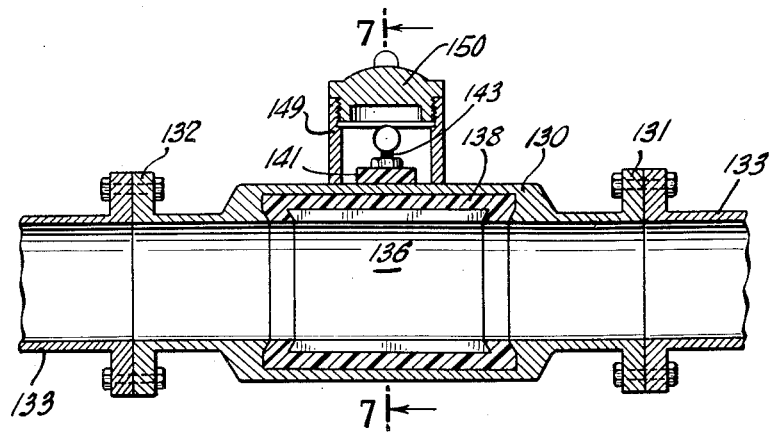
FIG. 6 is a longitudinal cross section view of a fixed electrode probe in accordance with yet another embodiment of the invention.

FIGS. 6 and 7 illustrate an embodiment of the invention wherein there are no moving parts. The structure is such that the central opening through the probe is the same diameter as the pipe line to which it is connected. This is accomplished by means of a housing or body 130 that has integrally attached thereto, at either end thereof, a pair of flanges 131 and 132 for use in attaching the probe into a pipe line 133. Symmetrically located within the central enlarged portion of the housing 130 there is a pair of sector shaped (in cross section) electrodes 136 and 137 which are semi-cylindrical in their general configuration. They are not connected together, but rather have longitudinal gaps at the top and bottom which gaps are filled with electrically insulating material 138 that surrounds both of the electrodes and acts as a supporting structure therefor. The insulating material 138 has a sleeve-like overall configuration and acts to insulate each of the electrodes 136 and 137 from the surrounding housing 130 as well as from each other.

There is an insulating material lug 141 that is centrally located at the top of the probe (when viewed as illustrated), and it supports a pair of electrically conductive material bolts 142 and 143 in an insulating manner from the housing 130. These bolts 142 and 143 are securely connected to the electrodes 136 and 137 respectively, and act to complete an electrical circuit for the electrodes by means of a pair of circuit connector wires 144 and 145. There is a protective enclosure 149 which surrounds the lug 141 and the terminal post ends of bolts 142 and 143. This enclosure 149 is integrally attached to the housing 130. It (enclosure 149) includes a threaded cap member 150 which may be removed for access to the connection posts for wires 144 and 145.

It is pointed out that there may be additional supporting bolts 153 and 154 that are integrally attached to the electrodes 136 and 137 respectively, near the lower edges thereof. These supporting bolts must include insulating sleeves 155 and 156 surrounding the bolts where they pass through the walls of housing 130, in order to insulate electrically the electrodes from the housing.

It will be clear that the structure of the FIGS. 6 and 7 embodiment is such as to provide a fixed electrode type of probe, while also having structure such that there is no internal obstruction for the passage of the pipe line fluid or any solid objects such as scrapers or the like which may be flowing therein.

While certain embodiments of the invention have been described in considerable detail in accordance with the applicable statutes this is not to be taken as in any way limiting the invention but merely as being descriptive thereof.

I claim:

1. A capacitance probe for a pipe line comprising a plurality of flat round electrodes having open space therebetween to allow the fluid in said pipe line to flow therein to act as the dielectric for said electrodes, the planes of said electrodes being substantially parallel and lying axially relative to said pipe line, a shaft extending into said pipe line and lying substantially at right angles to the axis thereof, means for centrally supporting each of said electrodes centrally on said shaft including electrical insulating means for insulating alternate ones of said electrodes from the rest thereof in order to provide capacitive effects therebetween, an enclosed passageway surrounding said shaft and connected to the exterior of said pipe line, threads on said shaft, rotatable means having internal threads matching said shaft threads, means for preventing said shaft from rotating with said rotatable means, housing for said passageway including support means for said rotatable means, drive means for rotating said rotatable means in either direction depending upon whether the electrodes are to be extended into said pipe line or to be retracted therefrom.

2. A capacitance probe for a pipe line comprising a plurality of flat round conductive material electrodes spaced apart in substantially parallel relation, a round shaft lying substantially at right angles to the axis of said pipe line and having a streamlined cross sectional configuration at the extremity thereof which extends into the stream of said pipe line, means for centrally supporting each of said electrodes on said shaft including electrical insulating means for insulating alternate ones of said electrodes from the rest thereof in order to provide capacitive effects therebetween, a housing connected to the exterior of said pipe line and including an enclosed passageway surrounding said shaft, said passageway having a round cross section of a diameter greater than said electrodes to permit ample clearance therefor, said passageway including a valve adjacent to said pipe line to close the passage after said electrodes have been retracted so that the electrodes may be removed without interrupting the flow of fluid in said pipe line, threads on said shaft spaced from said streamlined extremity thereof, a bevel gear having internal threads at the axis thereof and matching said shaft threads, a tongue on said housing, a longitudinal groove along one side of said shaft for cooperating with said tongue to prevent rotation of said shaft, support means for said bevel gear to prevent displacement thereof longitudinally relative to said shaft, drive means for rotating said bevel gear in either direction depending upon whether the electrodes are to be extended into said pipe line or to be retracted therefrom.

3. A retractable capacitance probe system for a pipe line comprising a retractable probe including retracting means and having motor means for driving the retracting means, first sensing means located upstream from said probe on said pipe line for sensing the passage of a solid article, a motor control circuit for controlling the energization of said motor means to retract said probe responsive to said sensing means, second sensing means located downstream from said probe on said pipe line for sensing the passage of said solid article and for providing a signal to said motor control circuit to return said probe into the pipe line.

4. In a capacitance probe for a pipe line, in combination a hollow tubular electrode having means for connecting said probe into the stream of said pipe line integrally therewith, said tubular electrode having an inside diameter substantially equal to the inside diameter of said pipe line, a relatively small diameter cylindrical electrode retractably supported and disposed longitudinally within said tubular electrode, a recess in one side of said tubular electrode having complementary dimensions relative to said cylindrical electrode for receiving said cylindrical electrode when retracted and extending in a radial dimension sufficient to insure clearance of the inside diameter of said tubular electrode by said cylindrical electrode when retracted, a shaft supporting said cylindrical electrode and extending at an angle to the axis of said tubular electrode, means cooperating with said shaft for moving said cylindrical electrode into said recess, and electrical disconnected means responsive to retraction for preventing a short circuit between said electrodes when said cylindrical electrode is retracted into said recess.

5. The combination according to claim 4 wherein said cylindrical electrode is supported coaxially within said tubular electrode.

References Cited in the file of this patent

UNITED STATES PATENTS

| | | |
|---|---|---|
| 1,255,622 | McFarland | Feb. 5, 1918 |
| 1,769,463 | Rice | July 1, 1930 |
| 2,665,409 | Rodgers | Jan. 5, 1954 |
| 2,720,624 | Gunst et al. | Oct. 11, 1955 |
| 2,800,394 | Peters | July 23, 1957 |
| 2,864,252 | Schaschl | Dec. 16, 1958 |
| 2,904,751 | Parsons | Sept. 15, 1959 |

FOREIGN PATENTS

| | | |
|---|---|---|
| 1,031,170 | France | June 22, 1953 |
| 121,163 | Australia | Mar. 21, 1946 |
| 700,099 | Germany | Dec. 13, 1940 |